(12) United States Patent
Krowl

(10) Patent No.: US 7,628,407 B1
(45) Date of Patent: Dec. 8, 2009

(54) COMPRESSED GAS CYLINDER CART WITH A FIRE AND HEAT RESISTANT BARRIER

(75) Inventor: Thomas R. Krowl, Littleton, CO (US)

(73) Assignee: BNZ Materials, Inc., Littleton, CO (US)

( * ) Notice: Subject to any disclaimer, the term of this patent is extended or adjusted under 35 U.S.C. 154(b) by 0 days.

(21) Appl. No.: 11/713,862

(22) Filed: Mar. 5, 2007

(51) Int. Cl.
*B62B 1/00* (2006.01)

(52) U.S. Cl. .............. 280/47.26; 280/47.19; 280/47.24; 280/47.27; 280/79.5; 280/79.6; 280/79.7; 266/48

(58) Field of Classification Search .............. 280/47.19, 280/47.24, 47.26, 47.27, 79.5, 79.6, 79.7; 266/48
See application file for complete search history.

(56) References Cited

U.S. PATENT DOCUMENTS

| | | | | |
|---|---|---|---|---|
| 1,408,400 A | * | 2/1922 | Richards ................... | 280/47.19 |
| 2,667,397 A | * | 1/1954 | Hallisey ................... | 312/249.8 |
| 5,307,839 A | * | 5/1994 | Loebker et al. ............. | 137/899 |
| 5,431,422 A | * | 7/1995 | Gamache ................. | 280/47.19 |
| 5,570,895 A | * | 11/1996 | McCue et al. ............ | 280/47.19 |
| 6,116,623 A | * | 9/2000 | Salvucci ................... | 280/47.26 |
| 6,116,623 A |  | 9/2000 | Salvucci |  |
| 6,228,175 B1 | * | 5/2001 | Ridgeway et al. ........... | 118/726 |
| 6,733,017 B2 | * | 5/2004 | Intravatola ................. | 280/79.6 |
| 7,252,297 B1 | * | 8/2007 | Barritt et al. ............. | 280/47.26 |
| 7,438,084 B2 | * | 10/2008 | Trettin et al. ........... | 137/355.16 |
| 2003/0029361 A1 | * | 2/2003 | Krowl et al. ................ | 106/672 |
| 2005/0225047 A1 | * | 10/2005 | Schilling et al. ........... | 280/79.7 |

* cited by examiner

*Primary Examiner*—Paul N Dickson
*Assistant Examiner*—Jacob Meyer
(74) *Attorney, Agent, or Firm*—Quinn & Quinn P.C.; William J. Quinn; Cornelius P. Quinn

(57) ABSTRACT

A portable cart with a noncombustible heat and fire resistant panel of calcium silicate for separating compressed oxygen cylinders from compressed fuel gas cylinders where the calcium silicate panel has a fire resistance rating greater than one half hour and spans the entire height and width between adjacent oxygen and fuel gas cylinders.

6 Claims, 2 Drawing Sheets

COMPRESSED GAS CYLINDER CART WITH A FIRE AND HEAT RESISTANT BARRIER

FIELD OF THE INVENTION

The present invention relates to methods of safely storing oxygen and fuel gas cylinders on portable carts; and more particularly, the present invention is directed toward a portable cart that provides a noncombustible heat and fire resistant barrier for separating compressed oxygen cylinders from compressed fuel gas cylinders.

BACKGROUND OF THE INVENTION

Portable carts for transporting oxygen and fuel gas cylinders are common place and widely used where welding and metal cutting operations take place. These portable carts typically have wheels to facilitate movement of the cart and hold two compressed gas cylinders side by side in an upright position with their valves uppermost. One of the cylinders contains oxygen and the other cylinder contains fuel gas, such as acetylene or propane. The cylinders are secured to the portable cart by a chain or bracket. While in operation and between uses, the oxygen and fuel gas cylinders are routinely stored on the portable cart with regulators and hoses still attached to the cylinder valves.

Although their use is indispensable for welding and metal cutting operations, use and storage of oxygen and fuel cylinders in near proximity to one another poses a particular danger. Should fuel gas, from a leak or unintentional release, ignite in near proximity to an oxygen cylinder, the heat released from the burning fuel gas can cause the pressure in the oxygen cylinder to rise. In the event that the rising pressure in the oxygen cylinder activates the pressure relief valve in the cylinder valve, oxygen gas would be released enriching the surrounding air and intensifying the fuel gas flame with potential catastrophic results. Because of the particular danger posed in the use and storage of oxygen and fuel gas cylinders in near proximity to one another, the United States Department of Labor, Occupational Safety & Health Administration has promulgated regulations for the use and storage of oxygen and fuel gas cylinders. Of particular relevance, title 29 Code of Federal Regulations section 1926.350(a) (10) provides that "Oxygen cylinders in storage shall be separated from fuel-gas cylinders or combustible materials (especially oil or grease), a minimum distance of 20 feet (6.1 m) or by a noncombustible barrier at least 5 feet high having a fire-resistance rating of at least one-half hour." The National Fire Protection Association has also recognized and addressed, in its regulations, the danger posed by storage of oxygen and fuel gas cylinders in near proximity to one another. The National Fire Protection Association regulations like the United States Department of Labor, Occupational Safety & Health Administration regulations require a 20 foot separation or 5 foot barrier of noncombustible material between oxygen and fuel gas cylinders; additionally, where a barrier of non-combustible material is used, the National Fire Protection Safety regulation 51 2-4.2 prescribes that "The barrier shall interrupt all lines of sight between oxygen and fuel-gas cylinders within 20 ft. of each other."

Attempts have been made in the prior art to construct portable carts, used in welding and metal cutting operations, that can safely store oxygen and fuel gas cylinders adjacent to one another on portable carts; these prior art attempts have met with limited success. In one attempt to provide a portable cart, upon which adjacent oxygen and fuel gas cylinders could be stored, a five foot tall ¼ inch thick steel plate was interposed as a barrier between the oxygen and fuel-gas cylinders. The United States Department of Labor, Occupational Safety & Health Administration found, in a letter opinion of Apr. 21, 1991, that this heavy gauge metal partition is not a compliant noncombustible barrier having a fire resistance rating of at least one half-hour.

U.S. Pat. No. 6,116,623 to Salvucci illustrates another attempt to provide a portable cart upon which adjacent oxygen and fuel gas cylinders could be stored. In the Salvucci cart, a flue constructed from metal sheet is interposed as a barrier between the oxygen and fuel-gas cylinders on the portable cart. The flue in the Salvucci cart provides a one inch wide air space between its metal sides separating the cylinders and is positioned with the lower end of the flue elevated above the platform that supports the cylinders to provide an air intake for the flue. As the lower end of the flue in the Salvucci cart is elevated above the cylinder support platform, the flue of the Salvucci cart does not provide a complete and uninterrupted barrier between the entire height of the oxygen and fuel gas cylinders.

Accordingly, it is an objective of the present invention to provide a portable cart for the use and storage of adjacent oxygen and fuel gas cylinders that provides a complete and uninterrupted noncombustible heat and fire resistant barrier separating the oxygen cylinder from the fuel-gas cylinder.

SUMMARY OF THE INVENTION

The present invention provides a portable cart for use in transporting and storing oxygen and fuel-gas cylinders for welding and metal cutting operations. The portable cart is constructed with a metal base platform having an upright side and back structure attached thereto. An oxygen cylinder and a fuel-gas cylinder are supported, upon the platform and contained by the upright side and back structure, in an upright side by side configuration. The upright side and back structure is typically constructed of welded tubular metal and is formed with a handle at its upper end and axles on each side of its lower end to which wheels are attached. A chain or bracket is attached in the front end of the portable cart between the upright side and back structure to secure the oxygen and fuel-gas cylinders. An upright calcium silicate panel is incorporated to form a continuous barrier between the oxygen cylinder and fuel-gas cylinder. The calcium silicate panel is attached to the platform and to the rear of the side and back support. The preferred calcium silicate panel used as a barrier is between 28 and 85 pounds per cubic foot, about ¾ to 2 inches thick and of a fundamental tobermorite-type or xonotlite-type crystalline matrix structure of calcium silicate material. Since the preferred calcium silicate panel is only ¾ to 2 inches thick and such space is typically found between the oxygen cylinder and fuel gas cylinder in pre-existing portable carts, portable carts with fire resistant barriers can be readily constructed by addition of the calcium silicate panel.

The fundamental tobermorite-type crystalline matrix structure of calcium silicate insulating material is produced by combining 12 to 40 weight percent of a source of calcium, such as hydrated lime or quick lime, 12 to 40 weight percent of a source of siliceous material, such as silica, diatomaceous earth, silica fume, colloidal silica, or other suitable oxides of silicon, up to 70 weight percent fibrous wollastonite and up to 10 percent of an organic fiber, such as kraft made from wood pulp, in the presence of water to form an aqueous slurry. The aqueous slurry is then poured into a mold where the excess water is pressed out of the mixture to form an uncured shape, typically a sheet. The uncured shape is then placed in an autoclave where it is heated under steam pressure of about 100 psi. The shape is then oven dried to about 250 degrees Fahrenheit, and subsequently heat treated to above 500 degrees Fahrenheit. Finally, the resultant tobermorite type calcium silicate insulating material is cut or machined to the appropriate dimensions.

The fundamental xonotlite crystalline matrix structure of calcium silicate insulating material is produced by mixing 12 to 40 weight percent of a source of calcium, such as hydrated lime or quick lime, 12 to 40 weight percent of a source of siliceous material, such as silica, diatomaceous earth, silica fume, colloidal silica, or other suitable oxides of silicon, up to 70 weight percent fibrous wollastonite, up to 10 percent of an organic fiber, such as kraft made from wood pulp and, water in an autoclave under about 200 psi steam pressure. The resultant aqueous slurry is then pressed in a mold, dried in an oven and cut or machined to the appropriate dimensions.

Alternatively, the fundamental xonotlite crystalline matrix structure of calcium silicate insulating material may be produced by mixing 12 to 40 weight percent of a source of calcium, such as hydrated lime or quick lime, 12 to 40 weight percent of a source of siliceous material, such as silica, diatomaceous earth, silica fume, colloidal silica, or other suitable oxides of silicon, up to 70 weight percent fibrous wollastonite, up to 10 weight percent of an organic fiber, such as kraft made from wood pulp, in the presence of water to form an aqueous slurry. The aqueous slurry is then poured into a mold where the excess water is pressed out of the slurry to form an uncured sheet. The uncured sheet is then placed in an autoclave where it is heated under steam pressure of about 200 psi. The sheet is then oven dried and cut or machined to the appropriate dimensions.

In another embodiment, the calcium silicate panel is constructed as a laminate panel to provide greater heat resistance and insulation between the oxygen cylinder and fuel-gas cylinder with a panel of sufficient strength that is the same overall width. The laminate panel is constructed with outer layers of calcium silicate sheet preferably between 28 and 100 pounds per cubic foot density and ½ to 1 inch thick, to provide structural strength and an inner layer of a lower density calcium silicate sheet than the outer layers, ½ to 1½ inches thick, to provide greater heat resistance and insulating properties.

In a further embodiment, the calcium silicate panel is constructed from two or more calcium silicate sheets, preferably between 28 and 100 pounds per cubic foot density and ½ to 1 inch thick, that are separated from each other with a gap between adjacent sheets of about ¼ to 1 inch. The gap between the calcium silicate sheets may be maintained by spacers and provides greater heat resistance by allowing ambient air to cool the calcium silicate sheets through the gap.

DETAILED DESCRIPTION OF THE DRAWINGS

Figure 1:
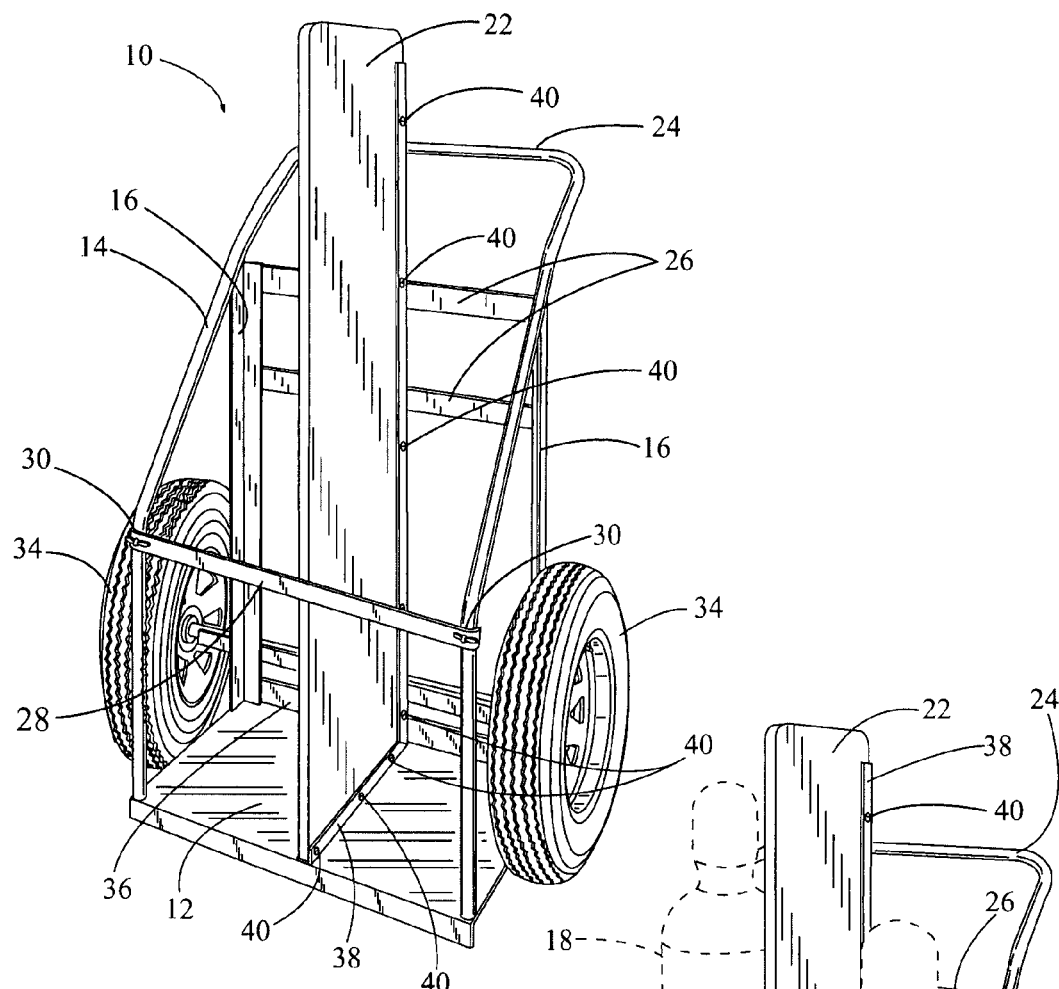
FIG. 1 is a perspective view of the compressed gas cylinder cart with a fire resistant barrier of the present invention.
Figure 2:
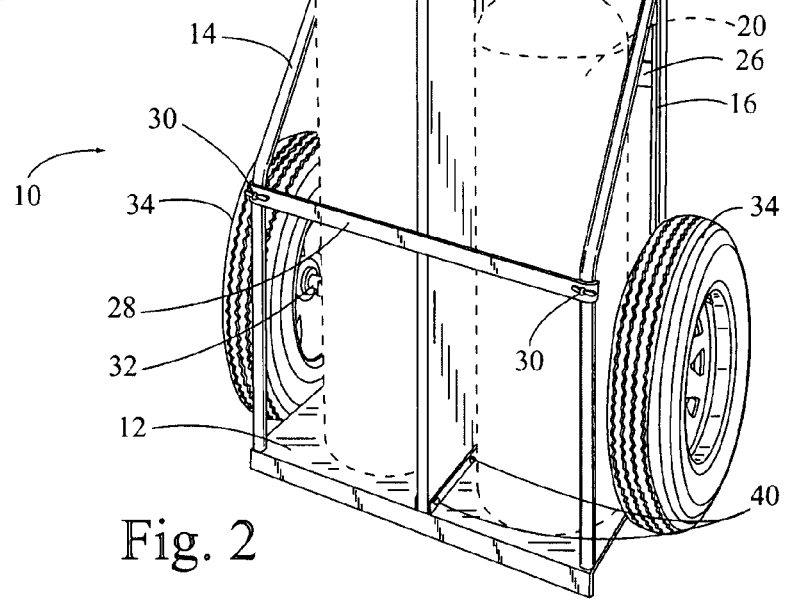
FIG. 2 is a perspective view of the compressed gas cylinder cart with a fire resistant barrier of the present invention showing the placement of the compressed gas cylinders.

FIGS. 1 and 2 illustrate the portable cart for use in transporting and storing oxygen and fuel-gas cylinders of the present invention. The portable cart 10 is constructed with a steel platform 12, rectangular in shape with a side frame 14 and upright back supports 16 attached and extending upward from its upper surface. The size of platform 12 is selected so that both an oxygen cylinder 18 and a fuel gas cylinder 20 can be supported thereon in upright fashion. Dividing platform 12 and separating oxygen cylinder 18 from fuel gas cylinder 20 is a calcium silicate panel 22. Preferably, the calcium silicate panel 22 is about ¾ to 2 inches thick, essentially rectangular in shape, extends from the forward end to the rearward end of platform 12, is at least 5 feet in height and, obstructs all lines of sight between oxygen cylinder 18 and fuel gas cylinder 20.

The side frame 14 is preferably constructed from tubular steel and is bent so that its end sections are parallel to one another, surrounding and containing oxygen cylinder 18 and fuel gas cylinder 20, and a handle section 24 perpendicular to the end sections is provided at its mid-section. The ends of side frame 14 are welded to platform 12 toward the forward end of platform 12 on each side and are inclined or bent toward the rear of platform 12. The two upright back supports 16 are constructed of tubular steel or angle stock and are welded at their lowermost ends to platform 12 toward the rearward end of platform 12 on each side and at their uppermost ends to side frame 14. A number of cross members 26 of steel plate are welded to and extend between the two upright back supports 16 to provide additional structural strength to the portable cart 10 and to contain the oxygen cylinder 18 and fuel gas cylinder 20 at the rear side of the portable cart 10. A removable containment strap 28 spans between the parallel end sections of side frame 14 to secure the oxygen cylinder 18 and the fuel gas cylinder 20 within the portable cart 10 at the forward side of the portable cart 10. The containment strap 28 is affixed with wing bolts 30 that pass through containment strap 28 and engage threaded apertures in side frame 14. An axle 32, upon which a wheel 34 is mounted, extends from the side of each upright back supports 16. The axles 32 and wheels 34 are located so that the portable cart 10 is fully supported upon the wheels 34 when it is tilted rearwards. The rearward edge of platform 12 is bent upward to form a stop 36 that engages the heel portion of oxygen cylinder 18 and fuel gas cylinder 20, to retain the oxygen cylinder 18 and the fuel gas cylinder 20 upon the portable cart 10 when it is tilted rearwards.

Calcium Silicate panel 22 serves as a fire and heat resistant barrier and is fabricated from a sheet of calcium silicate material. Angle stock spanning horizontally from the forward end to rearward end of platform 12 and vertically from the rearward end of platform 12 is welded to platform 12 and cross members 26 to form a barrier attachment strip 38. Self-tapping screws 40 passing through barrier attachment strip 38 secure calcium silicate panel 22 to the portable cart 10.

Figures 3, 3B:
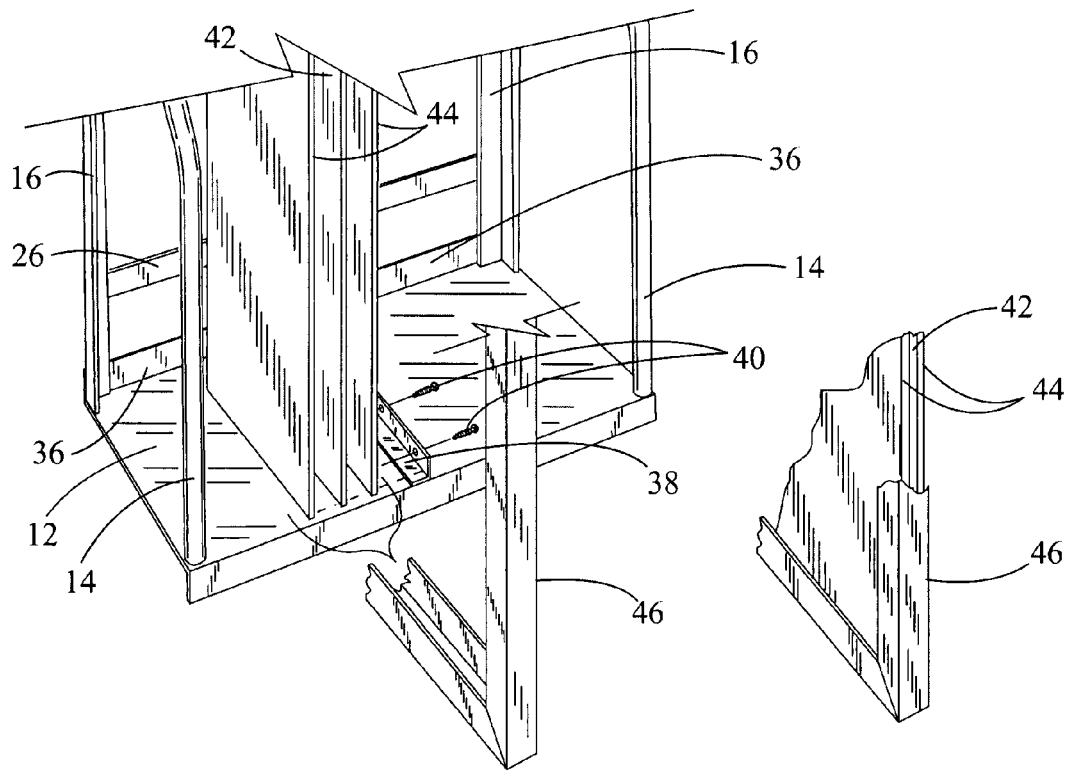
FIG. 3 is a partial perspective view illustrating a second embodiment of a calcium silicate panel attached to the compressed gas cylinder cart of the present invention with the components of the calcium silicate panel shown in exploded form.
FIG. 3B is a partial perspective view of the of the calcium silicate panel of the second embodiment of the present invention illustrating the calcium silicate panel in assembled form.

FIGS. 3 and 3B illustrate a second embodiment of the calcium silicate panel 22 of the present invention. In this second embodiment, calcium silicate panel 22 is constructed as a laminate of 3 or more calcium sheets. In the calcium silicate panel 22, an inner sheet 42, having a density of up to 85 pounds per square foot with a thickness of about ½ to 1 inches, is placed between outer sheets 44, that are about ½ to 1½ inches thick but have a greater density than inner sheet 42. A barrier frame 46, of steel or other noncombustible material, surrounds and engages the edges of inner sheet 42 and outer sheets 44 to secure them together without the need for adhesives.

Figure 4:
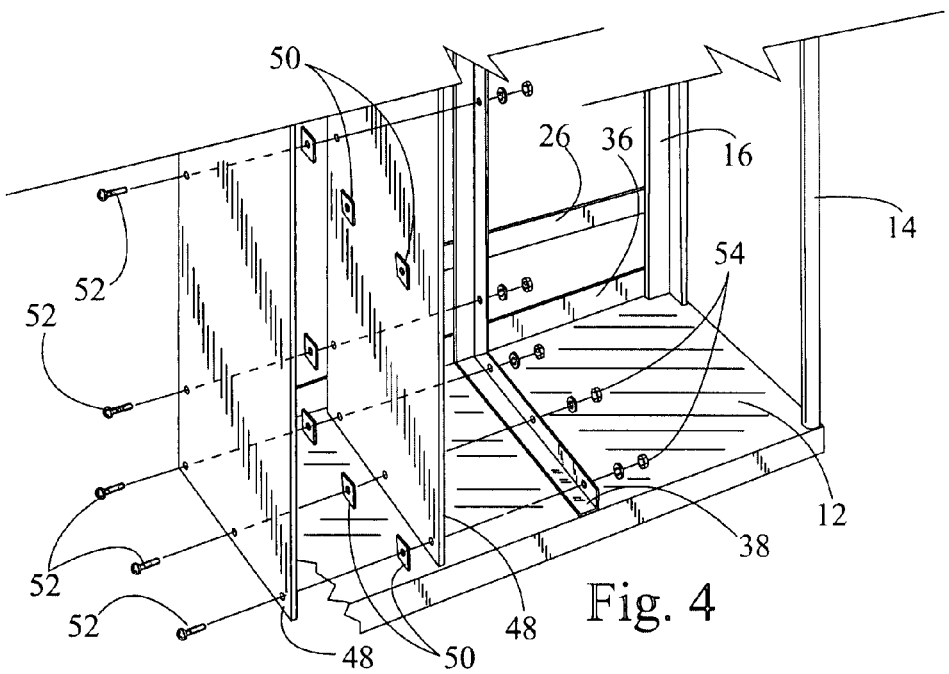
FIG. 4 is a partial perspective view illustrating a third embodiment of a calcium silicate panel attachment to the compressed gas cylinder cart of the present invention with the components of the calcium silicate panel shown in exploded form.

FIG. 4 illustrates a third embodiment of the calcium silicate panel 22 of the present invention. In this third embodiment, calcium silicate panel 22 is constructed with two or more calcium silicate sheets about ½ to 1 inch thick, separated by an air gap that is preferably between ¼ and 1 inch thick. Calcium silicate sheets 48 are placed in parallel alignment, and a number of spacers 50 located between them produce the air gap. A number of screws 52 pass through calcium silicate sheets 44 and spacers 46 and are secured by nuts 54 to create a single calcium silicate panel 22. Alternatively, a barrier frame, as in FIGS. 3 and 3B may be utilized to secure the calcium silicate sheets 48 as a single calcium silicate panel 22 and produce and enclose the air gap between the calcium silicate sheets 48.

Although the detailed description of the drawings is directed toward illustrating the above described preferred embodiments, the present invention is not limited to such embodiments, as variations and modifications may be made without departing from the scope of the present invention as claimed herein.

What is claimed is:

1. A portable cart for transporting and storing oxygen and fuel gas cylinders comprising:
    a platform for supporting an oxygen gas cylinder and a fuel gas cylinder in an upright side by side arrangement;
    a frame structure attached to said platform for containing said oxygen gas cylinder and said fuel gas cylinder, and;
    a calcium silicate panel fixed between said oxygen gas cylinder and said fuel gas cylinder,
    wherein said calcium silicate panel obstructs all lines of sight between said oxygen gas cylinder and said fuel gas cylinder, and said calcium silicate panel is comprised of a laminate of two outer calcium silicate sheets and at least one inner calcium silicate sheet of lower density than said outer calcium silicate sheets.

2. A portable cart for transporting and storing oxygen and fuel gas cylinders as recited in claim 1 wherein said two outer calcium silicate sheets each have a density of between 28 and 100 pounds per cubic foot and are between ½ and 1 inch thick, and said inner calcium silicate sheet is between ½ and 1½ inches thick.

3. A portable cart for transporting and storing oxygen and fuel gas cylinders as recited in claim 1 further comprising a barrier frame securing said calcium silicate sheets and encircling the edges of said calcium silicate sheets.

4. A portable cart for transporting and storing oxygen and fuel gas cylinders comprising:
    a platform for supporting an oxygen gas cylinder and a fuel gas cylinder in an upright side by side arrangement;
    a frame structure attached to said platform for containing said oxygen gas cylinder and said fuel gas cylinder, and;
    a calcium silicate panel fixed between said oxygen gas cylinder and said fuel gas cylinder, wherein said calcium silicate panel is fixed so that the entire width and depth of said calcium silicate panel at its lower end is in contact with said platform, and said calcium silicate panel obstructs all lines of sight between said oxygen gas cylinder and said fuel gas cylinder by said entire width of said calcium silicate panel, and wherein said calcium silicate panel is comprised of a number of calcium silicate sheets fixed in parallel separation from one another forming an air gap open on at least three sides between adjacent calcium silicate sheets.

5. A portable cart for transporting and storing oxygen and fuel gas cylinders as recited in claim 4 wherein said calcium silicate sheets each have a density of between 28 and 100 pounds per cubic foot and are between ½ and 1 inch thick, and said air gap is between ¼ and 1 inch.

6. A portable cart for transporting and storing oxygen and fuel gas cylinders comprising:
    a platform for supporting an oxygen gas cylinder and a fuel gas cylinder in an upright side by side arrangement;
    a frame structure attached to said platform for containing said oxygen gas cylinder and said fuel gas cylinder, and;
    a calcium silicate panel fixed between said oxygen gas cylinder and said fuel gas cylinder,
    wherein said calcium silicate panel obstructs all lines of sight between said oxygen gas cylinder and said fuel gas cylinder, and
    said calcium silicate panel is comprised of a number of calcium silicate sheets fixed in parallel separation from one another forming an air gap between adjacent calcium silicate sheets, and has a barrier frame securing said calcium silicate sheets, encircling the edges of said calcium silicate sheets and enclosing said air gap.

* * * * *